(12) United States Patent
Reynertson

(10) Patent No.: US 10,216,765 B2
(45) Date of Patent: Feb. 26, 2019

(54) IMAGE BASED ROUTING AND CONFIRMATION

(71) Applicant: HERE Global B.V., Veldhoven (NL)

(72) Inventor: Katherine R. Reynertson, Naperville, IL (US)

(73) Assignee: HERE Global B.V., Eindhoven (NL)

(*) Notice: Subject to any disclaimer, the term of this patent is extended or adjusted under 35 U.S.C. 154(b) by 502 days.

(21) Appl. No.: 14/526,232

(22) Filed: Oct. 28, 2014

(65) Prior Publication Data
US 2016/0117348 A1 Apr. 28, 2016

(51) Int. Cl.
G06F 17/30 (2006.01)

(52) U.S. Cl.
CPC .. *G06F 17/30268* (2013.01); *G06F 17/30241* (2013.01)

(58) Field of Classification Search
CPC ............. G06F 17/30268; G06F 17/30241
USPC ........................................ 707/769
See application file for complete search history.

(56) References Cited

U.S. PATENT DOCUMENTS

| | | | |
|---|---|---|---|
| 6,718,258 B1 | 4/2004 | Barton | |
| 6,819,783 B2* | 11/2004 | Goldberg | G03D 15/001 382/103 |
| 6,853,905 B2 | 2/2005 | Barton | |
| 7,580,952 B2* | 8/2009 | Logan | G06F 17/30265 707/802 |
| 7,680,340 B2* | 3/2010 | Luo | G06F 17/30247 382/113 |
| 7,813,560 B2* | 10/2010 | Kraus | G06F 17/30247 382/224 |
| 7,860,320 B2* | 12/2010 | Luo | G06K 9/00664 382/227 |
| 7,941,270 B2* | 5/2011 | Hughes | G01C 21/3647 701/421 |
| 8,055,081 B2* | 11/2011 | Luo | G06F 17/30265 382/224 |
| 8,185,307 B2* | 5/2012 | Sprigg | G01C 21/343 701/400 |
| 8,204,684 B2 | 6/2012 | Forstall et al. | |
| 8,738,051 B2* | 5/2014 | Nowack | H04L 29/06176 455/428 |
| 9,080,887 B2* | 7/2015 | Geelen | G01C 21/32 707/802 |

(Continued)

OTHER PUBLICATIONS

Getting and Printing Directions, accessed Sep. 17, 2014, support.google.com/earth/answer/148083.

(Continued)

*Primary Examiner* — Shahid A Alam
(74) *Attorney, Agent, or Firm* — Lempia Summerfiled Katz LLC

(57) ABSTRACT

Systems, methods, and apparatuses are described for image based routing and confirmation. A routing request for a point of interest is received. A point of interest for the routing request may be identified from a geographic database. A message is sent to a user device, and the message includes an option to confirm or reject a destination based on the routing request that corresponds to the point of interest. When the destination is rejected, a set of point of interest images from one or more sources is selected. The set of point of interest images from the one or more sources may be sent to the user device.

16 Claims, 15 Drawing Sheets

(56) References Cited

U.S. PATENT DOCUMENTS

| | | | | | |
|---|---|---|---|---|---|
| 9,599,476 | B2* | 3/2017 | Mund | .................... | G01C 21/32 707/802 |
| 2004/0064339 | A1* | 4/2004 | Shiota | .................... | G06Q 10/10 345/619 |
| 2004/0208365 | A1* | 10/2004 | Loui | .................... | G06F 17/3025 382/171 |
| 2005/0105775 | A1* | 5/2005 | Luo | .................... | G06F 17/30247 382/115 |
| 2005/0128305 | A1* | 6/2005 | Hamasaki | ......... | G06F 17/30265 348/207.99 |
| 2006/0104520 | A1* | 5/2006 | Kraus | ............... | G06F 17/30265 382/225 |
| 2006/0221779 | A1* | 10/2006 | Matsushita | ......... | G06F 17/3028 369/30.01 |
| 2007/0081813 | A1* | 4/2007 | Hong | .................... | G03B 17/24 396/310 |
| 2007/0297683 | A1* | 12/2007 | Luo | .................... | G06K 9/00664 382/224 |
| 2009/0018766 | A1* | 1/2009 | Chen | .................... | G06F 17/3087 701/533 |
| 2009/0257663 | A1* | 10/2009 | Luo | .................... | G06F 17/30265 382/224 |
| 2010/0153348 | A1 | 6/2010 | Perczynski et al. | | |
| 2010/0332119 | A1* | 12/2010 | Geelen | .................... | G01C 21/32 701/533 |
| 2011/0313779 | A1 | 12/2011 | Herzog et al. | | |
| 2013/0110631 | A1* | 5/2013 | Mitchell | ............... | H04W 4/185 705/14.58 |
| 2014/0031070 | A1* | 1/2014 | Nowack | ............ | H04L 29/06176 455/466 |
| 2015/0186426 | A1* | 7/2015 | Jeong | ................. | G06K 9/00671 382/103 |

OTHER PUBLICATIONS

Letham, Mapping How to—Reporting Map Errors to Google Maps, Bing, Mapquest, OSM, and Others Data Providers, Mar. 28, 2011, GISuser.com.

Whitney, How to Tell Apple About a Mistake in its Maps App, Sep. 25, 2012, cnet.com/news/how-to-tell-aple-about-a-mitake-in-its-maps-app/.

* cited by examiner

IMAGE BASED ROUTING AND CONFIRMATION

FIELD

The following disclosure relates to image based routing and confirmation, or more particularly, systems and algorithms for identifying and sending point of interest images based on routing requests.

BACKGROUND

Navigation systems and devices provide routing features, such as calculating routes to desired destinations such as points of interest (POIs) and providing guidance for following the routes. In order to provide these features, navigation systems use geographic data that may include information about the locations of specific POIs, as well as, detailed information regarding the network of roads and intersections, estimated travel times along road segments, the speed limits along roads, and other information useful for selecting one route over another.

The collection of geographic data for use in navigation systems may be a significant undertaking. For example, the initial collection of data about the roads in a geographic area may be time consuming. Also, geographic data used in navigation systems become out-of-date. Specifically, POIs may move locations, new POIs may open, and new roads are built. There also may be errors in the initially collected geographic data.

Accordingly, end users who have navigation systems may discover that certain geographic data used in their navigation systems are not up-to-date, not correct, or not entirely accurate. Updating and checking the geographic data may involve significant efforts. Therefore, providing up-to-date and accurate geographic data, such as for use in navigation systems, is a continuing effort.

SUMMARY

Systems, methods, and apparatuses are described for image based routing and confirmation. A routing request for a point of interest is received. A point of interest image for the routing request may be identified from a geographic database. A message is sent to a user device, and the message includes an option to confirm or reject a destination based on the routing request that corresponds to the point of interest. When the destination is rejected, a set of point of interest images from one or more sources is selected. The set of point of interest images from the one or more sources may be sent to the user device.

BRIEF DESCRIPTION OF THE DRAWINGS

Exemplary embodiments are described herein with reference to the following drawings.

DETAILED DESCRIPTION

Figure 1:
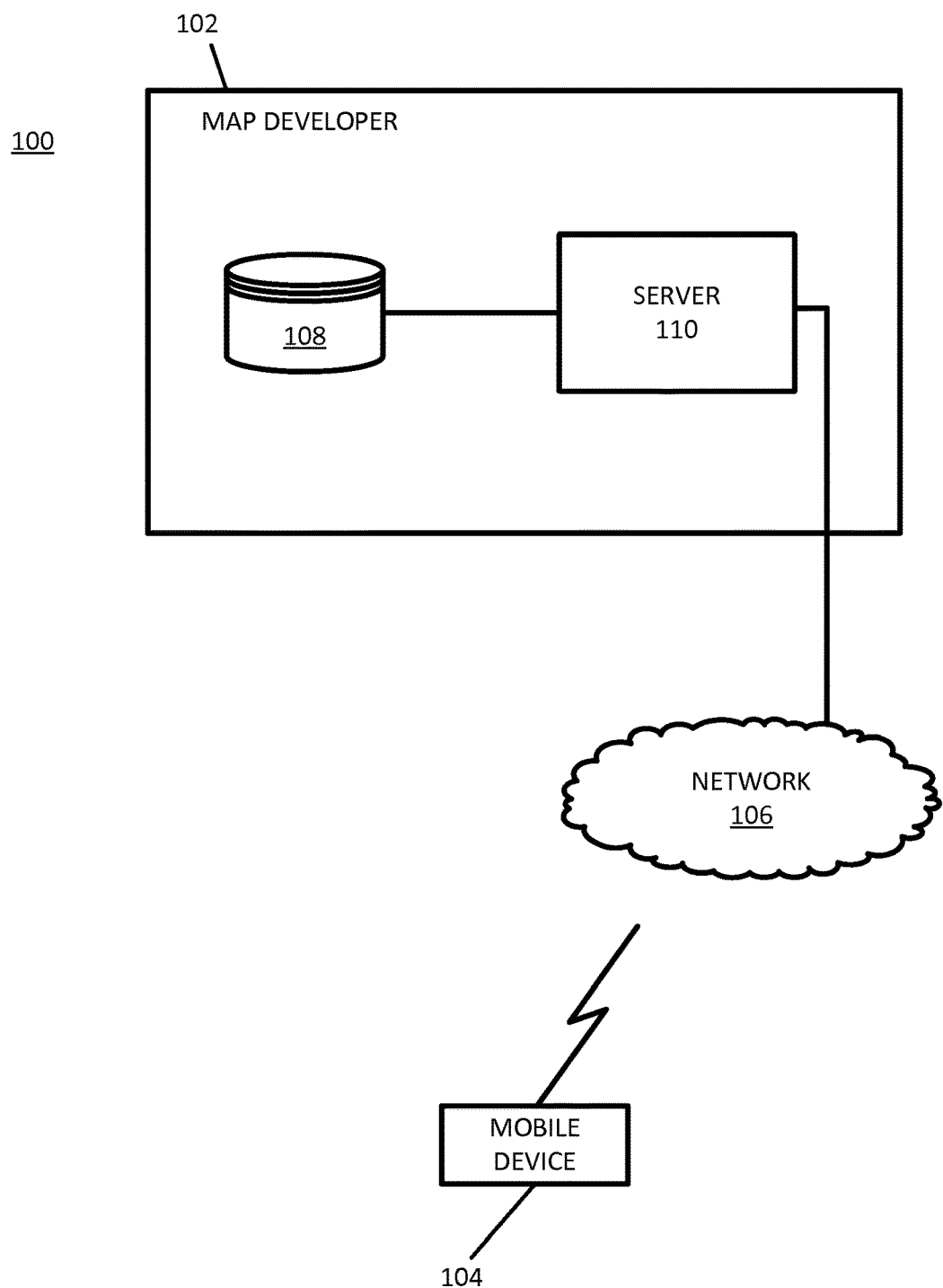
FIG. 1 illustrates an example system for determining image based routing and confirmation.

The following embodiments provide systems and methods for image based routing and confirmation. A mobile mapping or navigation application is provided which prompts the user for the correctness of data upon the arrival at a destination. Upon arriving at the destination, the user may be prompted to confirm or reject the destination. Additionally, a user may be prompted on a navigation device. If any data is incorrect, the user may be presented with images from the surrounding area to find the correct location of the destination. The images are provided by the mobile mapping or navigation application to the user on the mobile device or navigation device. The user is then able to select the image corresponding to the correct intended destination. This user feedback can be used to confirm and/or deny the correctness or freshness of the existing data for the mapping developer.

In one embodiment, a user intends to travel to a specific location, and uses a mobile application to identify the location. The mobile mapping or navigation application provides a route to the user that takes the user to the specific location. When the user arrives at the destination, the mobile mapping or navigation application will prompt the user, asking whether or not the route took the user to the correct destination. If the user selects "Yes" then the yes response is reported back to the mobile mapping or navigation application. The mobile mapping or navigation application then engages in an additional confirmation that the destination is in the correct place on the map. The system may record the response from the user to increase a factor, or number, which represents an association between the image and the location.

If the user selects a negative response, "No", the mobile mapping or navigation application is notified that the location of the destination should be verified because the location stored in a database for the mobile mapping or navigation application may be incorrect. The system may record the response from the user to decrease a factor, or number, which represents an association between the image and the location. In response to the negative response, the mapping or navigation application may suggest alternative locations to the user which may be the correct location. The suggested alternative locations may take the form of images presented to the user. The user may be presented with any available images within a predefined distance of a point from a fixed or variable radius of the current location. The current location of the user may be determined by the mobile device, or navigation device, in use by the user. If the user sees the user's desired destination the user can select that image. If not, the user may opt to widen the image search radius. The user may repeat this process for as long as is necessary and practical. If the user chooses an image, the mobile mapping or navigation application may reroute the user to the latitude and longitude of the image and may repeat the confirmation process.

In another embodiment, a non-transitory computer readable medium is operable to execute instructions for image based routing. The instructions when executed receive a destination request to a point of interest, present a route, or a portion thereof to the point of interest, provide an option via a user device to display a set of images based on a location corresponding to the requested point of interest, or based on a current location of the user device when the current location is within a predefined distance from the location corresponding to the requested point of interest, wherein images within the set of images are selectable. The instructions present a route or portion thereof to a location corresponding to a selected image within the set of images.

FIG. 1 illustrates an example system 100 for determining image based routing and confirmation. The system 100 includes a developer system 102, one or more mobile devices 104, and a network 106. Additional, different, or fewer components may be provided. For example, many mobile devices 104 connect with the network 106. The developer system 102 includes a server 110 and one or more databases.

Database 108 may be a geographic database that stores point of interest data collected from one or more mobile devices 104, or point of interest stored in the database 108 as part of the map developer system 102. The point of interest data may include business names that are stored in a table in the database 108. Similarly, the point of interest data may include addresses that are associated with business names stored in a table in the database 108. The business names stored in the database 108 associated with addresses may also include geographic coordinates indicating where in a map to locate the point of interest associated with the business name. The point of interest data may also include names of landmarks that are of particular interest to a user, such as hotels, restaurants, gas stations, stores, shopping centers, landmarks, natural features (e.g., a canyon, or mountain) or other combinations thereof. Additionally, the point of interest may be stored in database 108 by category rather than business name. A category may be a category term such as "coffee shop," where the database 108 may have stored points of interest by the category "coffee shop."

Data collected from the mobile device 104 may be sent to the server 110 through the network 106 by the mobile device 104. The server 110 receives a routing request for a point of interest. A routing request may be a user query for a location that may be stored in a database 108. The location may be a destination which the user wishes to reach, or a point of interest the user is on route to. The routing request may be received when a user of the mobile device 104 intends to travel, or while traveling. The user of a mobile device 104 may suggest routing for walking on foot, bicycling, or driving a vehicle to a particular point of interest.

The server 110 may send a route to the destination to the mobile device 104 or the mobile device 104 may calculate the route directly. The route calculation determines the route for the end user to travel along path segments to reach the desired destination from a specified origin or the current position of the mobile device 104. Given at least the identification of the starting location (origin) and the desired destination location, one or more solution routes between the starting location and the destination location are identified. A solution route is formed of a series of connected path segments over which the end user can travel from the starting location to the destination location. The database 108 or local memory is accessed for data that represent path segments around and between the starting location and the destination location, and the route is constructed from the path segments. The server 110, or in some embodiments the mobile device 104, is configured to send a message to the mobile device 104 with an option to confirm or reject a destination based on the routing request that corresponds to the point of interest. The message may display a message querying a user if the destination is correct that corresponds with the routing request. In some embodiments, a point of interest image associated with a routing request is displayed to the user prior to the user arriving at the destination for the routing request. In other embodiments, the point of interest image is displayed to the user when the user arrives at the destination for the routing request.

The server 110 is configured to send a message to the mobile device 104 with an option to confirm or reject a destination based on the routing request that corresponds to the point of interest. The message may display a message querying a user if the destination corresponds with the routing request. In other embodiments, a point of interest image may be displayed for the destination. The point of interest image may include, but is not limited to, one or more indoor images. In some embodiments, the point of interest image displayed to the user is displayed prior to the user arriving at the destination for the routing request. In other embodiments, the point of interest image is displayed to the user when the user arrives at the destination for the routing request.

In response to the option to confirm or reject the destination, the mobile device 104 may generate a reply message for the server 110. The reply message may include data indicative of a confirmation or a rejection of the initial point of interest. The data indicative of a confirmation or a rejection may be stored in the database 108. In particular, the confirmation or rejection data may be used to update a table in the database 108. The GPS coordinates of the destination, which is confirmed or rejected by the user, may be sent to the database 108 and the entry in the database may be updated with the confirmation or rejection and the GPS coordinates. The system may add to the table entry for the point of interest displayed to the user. Alternatively, the system may delete an entry in the table for the point of interest displayed to the user. Similarly, the system may record the confirmation or rejection to the table entry for the point of interest with a particular weight, or count, given to the confirmation or rejection. In response to a threshold weight or count the system may delete a point of interest from being associated with the point of interest table in the database 108.

In an embodiment, the user may arrive at a destination and determine that the destination does not correspond to the correct point of interest. Without any prompting, the user may provide an input to the mobile device 104 that indicates the user arrived an incorrect or unexpected location. The user may search through a set of point of interest images identified by the server 110 based on a variety of factors. The user may then select an image from the set of images to identify the correct point of interest. The user selection may be transmitted to the system 100 to be recorded in the database 108.

The server 110, or in some embodiments the mobile device 104, is configured to select, when the destination is rejected, a set of point of interest images from one or more sources. When the destination is rejected, the likely cause is that the location or address for the point of interest from the routing request in the database 108 is incorrect. The server 110 may search for other possible locations illustrated by the set of point of interest images. The set of point of interest images are images that are associated with locations or addresses near the point of interest from the routing request. A variety of techniques may be employed to select the set of point of interest images. Additionally, a user may search for addresses to select the next destination. For example, a user may supply an address to the user device, arrive at the geographic coordinates associated with that address and then indicate to the system that the location the user is at is not the correct location. The user may update the system with point of interest information that associates the correct geographic coordinates with the address.

The set of point of interest images may include, but is not limited to, one or more indoor images. Indoor images which correspond to point of interests may be more difficult for a user to observe, or identify, when they perform a search for a point of interest. More particularly, a user may arrive at what they believe to be the correct destination, but are unable to see the searched for point of interest, because the searched for point of interest is located inside of a building. The set of point of interest images including indoor images expands the user's ability to correctly determine if a point of interest is located at the correct geographic location.

The set of images may be obtained from a public network, such as the Internet, a private network, such as an intranet, social networking sites, photo sharing sites, a map developer database, or combinations thereof. The set may include one or more point of interest images. The set of point of interest images may be filtered based on one or more characteristics. The filtering may include, but is not limited to, identifying when multiple images are associated with the same point of interest. The filtering may also include, but is not limited to, selecting a representative image from multiple images associated with the same point of interest. The one or more characteristics may include, but is not limited to, the time of day, the popularity of the source of the point of interest image, a defined priority list of sources for point of interest images, confidences scores for point of interest images, or some combination thereof.

Additionally, the filtering may be based on the content of an image using computer vision techniques. The computer vision techniques used may be, but are not limited to, edge detection, feature matching, image recognition, and feature extraction. For example, a user may arrive at a location and identify it is not the correct location. The system may filter the images to provide to the user based on categorized content of the image. For example, the user may indicate to the system that they are interested in search results for a building, but the location the user is currently at is a beach. The computer vision algorithm may analyze the pixels contained in the image.

The message may display a point of interest image, and a message querying a user if the displayed point of interest image is the correct image that corresponds with the routing request. In some embodiments, the point of interest image displayed to the user is displayed prior to the user arriving at the destination for the routing request. In other embodiments, the point of interest image is displayed to the user when the user arrives at the destination for the routing request.

The server 110, or in some embodiments the mobile device 104, is configured to send, to the user device, a set of point of interest images from one or more sources. The system may repeat itself iteratively until the user arrives at their request destination. During each iteration the system may in response to confirmations and rejections of potential point of interest images update, add to, delete from, weigh, or correct, entries in the table for points of interest in the database 108.

In another embodiment, the server 110, or the mobile device 104, is configured to identify a point of interest image for the routing request from a geographic database, which may be the database 108 in FIG. 1. The server 110, or the mobile device 104, identifies the point of interest image by performing a query on the database 108. The query may be based on a user search which may be a search for a business name, or street address. The point of interest images may be stored in the database 108 or one or more databases accessible across the network 106. The point of interest images may be user submitted, published to a public network accessible by the user of the mobile device 104, contained on a social network accessible to the user, or some combination thereof.

The identified point of interest image may be identified in part by taking into consideration the orientation of the mobile device 104, the distance from the mobile device 104 to the routing request, the time of day, the popularity of the source of the point of interest image, a defined priority list of sources for point of interest images, confidences scores for point of interest images, or some combination thereof.

The mobile device 104 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The developer system 102 and the mobile device 104 are coupled with the network 106. The phrase "coupled with" is defined to mean directly connected to or indirectly connected through one or more intermediate components. Such intermediate components may include hardware and/or software-based components.

Computing resources for determining image based routing may be divided between the server 110 and the mobile device 104. In some embodiments, the server 104 performs a majority of the processing for calculating image based routing and confirmation. In other embodiments, the mobile device 104 performs a majority of the processing. In addition, the processing is divided substantially evenly between the server 110 and the mobile device 104.

Figure 2:
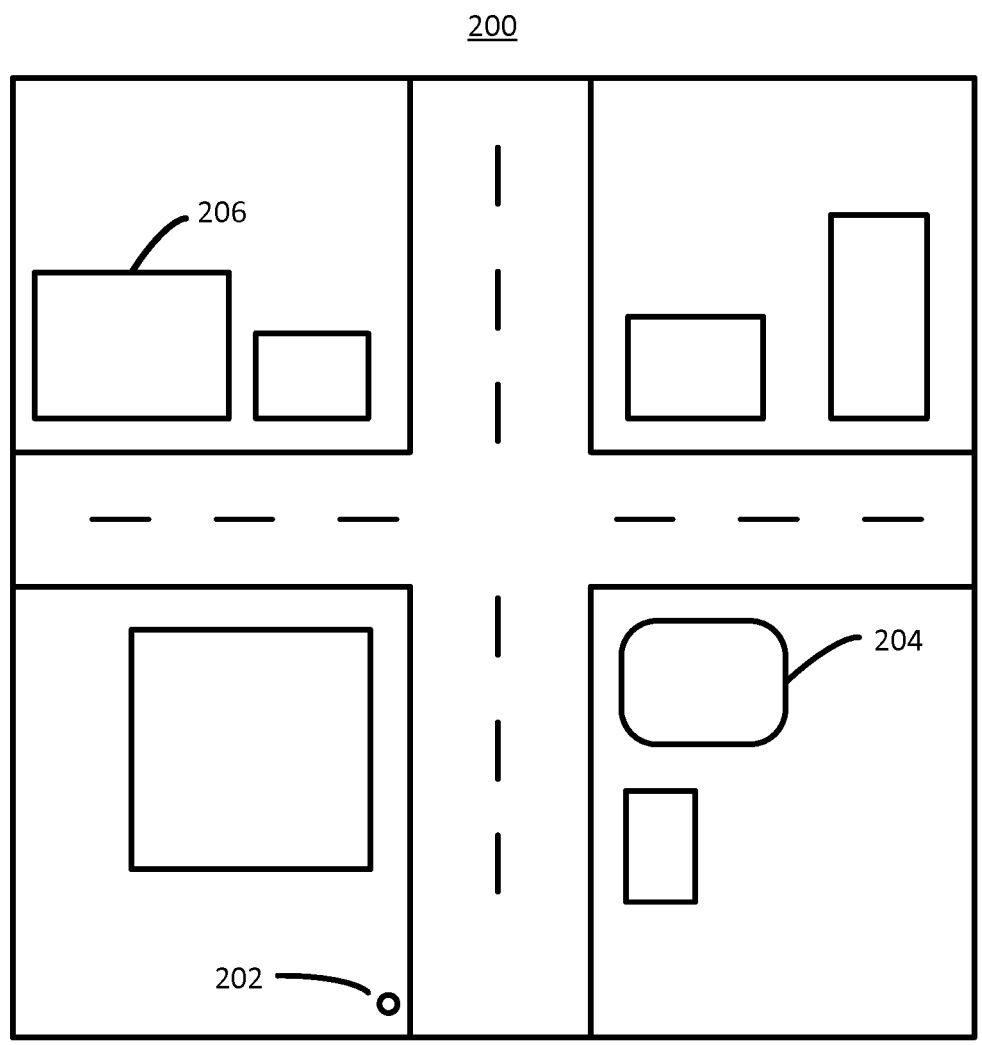
FIG. 2 illustrates an example overhead map of a street intersection.
Figure 3:
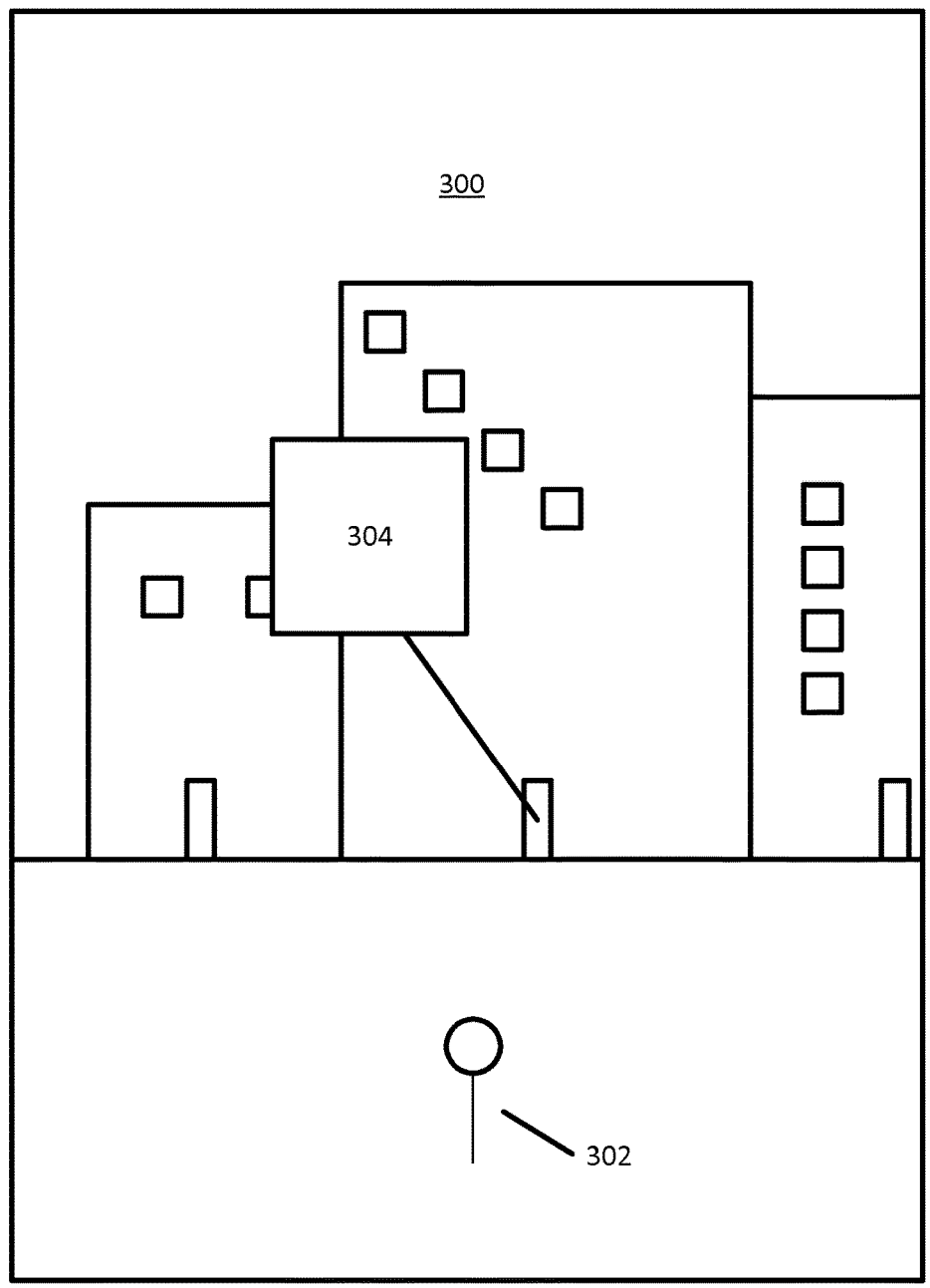
FIG. 3 illustrates example storefronts viewed from the street with a point of interest image.
Figure 4:
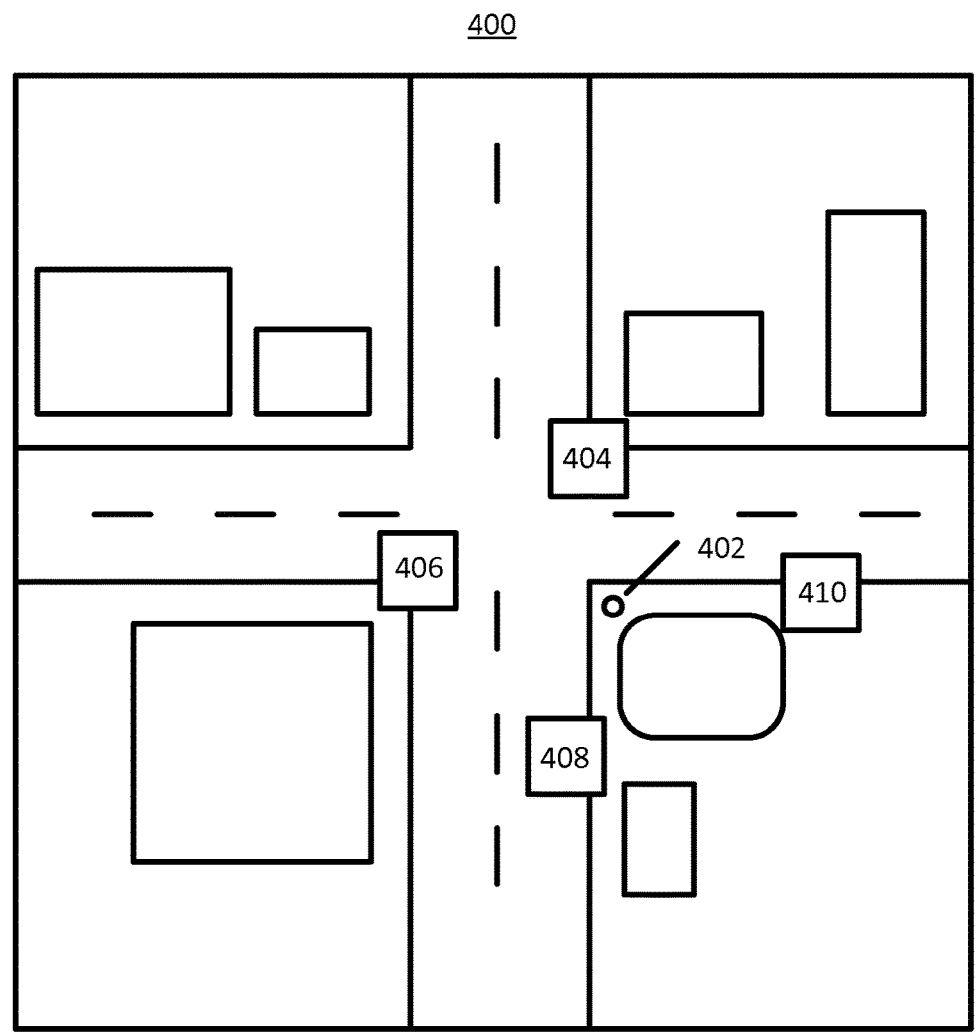
FIG. 4 illustrates an example overhead map of a street intersection with point of interest images overlaid.

FIGS. 2, 3, and 4 illustrate example displays of map views without and with overlaid point of interest images. The images of FIGS. 2, 3, and 4 may correspond to the map views presented on a mobile device such as the mobile device 104 of FIG. 1. The term map views may refer to terrestrial images taken from the ground or near the ground (i.e., not aerial images or satellite images). Alternatively, map views may refer to aerial images or satellite images.

The map views may consist of road maps, street maps, topographical maps, graphical maps, geographic information system maps, maps of the built environment (e.g., maps showing buildings in terms of elevation), or some combination thereof. The map views may be presented automatically by the server 110 or in some embodiments the mobile device 104. Alternatively, the map views may be selected by a user of the system 100.

FIG. 2 illustrates an example map view 200 that may be presented during operation of the system 100. In the example shown, a user 202 of a mobile device, such as the mobile device 104 of FIG. 1, is depicted on the map view 200. Potential point of interest locations 204 and 206 are displayed on the map view 200. Additional points of interest may be included.

In the example map view 200, the user 202 of the mobile device may enter a routing request for a point of interest. The routing request may consist of a business name, a category name for a type of business (e.g., "coffee shop"), address, or some other data indicative of a point of interest. In one embodiment the system 100 of FIG. 1 processes the request and may route the user to one of the potential point of interest locations 204 or 206. Once the user 202 of the mobile device arrives at the indicated point of interest location, 204 or 206, the user may be prompted by the system 100 of FIG. 1 with an image that may correspond to the potential point of interest location 204 or 206.

FIG. 3 illustrates an example street side view 300 that may be presented during operation of the system 100. In the example shown, a user 302 of a mobile device, such as the mobile device 104 of FIG. 1, is depicted on the street side view 300. Potential point of interest location 304 is displayed on the street side view 300.

In the example map street side 300, the user 302 of the mobile device has entered a routing request for a point of interest. Once the user 302 arrives at the point of interest, an image of the point of interest 304, as indicated in a database, such as the database 108 of FIG. 1, may be displayed on the street side view 300. The user may be prompted to indicate whether the point of interest image 304 corresponds with the requested point of interest. The point of interest image 304 may correspond to an image that is viewable from the street level by a user, or may also correspond to an image of a point of interest that is only viewable inside of a structure.

In the embodiment in which the point of interest image is displayed before or during the mobile device 104 traversing the route, only the request POI and associated location may be used in selected the point of interest image. However, other factors may be considered when the user and the mobile device 104 have already arrived near the destination.

The identified point of interest image may be identified in part by taking into consideration the orientation of the mobile device 104, the distance from the mobile device 104 to the routing request, the time of day, the popularity of the source of the point of interest image, a defined priority list of sources for point of interest images, confidences scores for point of interest images, or some combination thereof.

The orientation of the mobile device 104 may indicate a direction that the user and or the mobile device 104 is facing or traveling toward. People often face and/or travel toward the direction that they expect the point of interest to be located. The server may be configured to apply the orientation and the current location of the mobile device 104 to define a region. The server may search images in a public network, such as the Internet, a private network, such as an intranet, social networking sites, photo sharing sites, a map developer database, or combinations thereof, with locations associated with locations in the region. By taking into consideration the orientation of the mobile device 104 the system 100 of FIG. 1 may increase the success rate of finding the right point of interest for the user 302 of the mobile device.

Similarly, the distance from the mobile device 104 to the routing request, may be taken into consideration when the system 100 of FIG. 1 is determining which point of interest image 304 to display to the user 302 of the mobile device. For example, a user may search for the word "Lexington." The system 100 of FIG. 1 may then determine that stored in the database 108 of FIG. 1 are two entries for "Lexington," one in Lexington, Ky., and one in Lexington, Minn. The system may then determine that the mobile device 104 is located roughly 20 miles outside of Lexington, Ky., and 770 miles outside of Lexington, Minn., therefore, the system may determine to only display the point of interest image 304 corresponding to the closer of the two destinations to the mobile device 104.

The server 110 may take into consideration the time of day as measured by the mobile device. For example, it might not be useful to display to a user 302 of the mobile device a point of interest image 304 that displays the point of interest at night time if the user 302 of the mobile device has arrived at the location during day time, because the point of interest may not be easily identifiable from the night time image. Thus, the server 110 may identify a current time from the routing request and prioritize images based on timestamps and a time of day difference between the current time and the timestamps of the images.

Additionally, the popularity of the source of the point of interest image may be taken into consideration by the system when determining which point of interest image to display to the user. A popularity score of the source of the point of interest image may be calculated based on a frequency of previous destinations or other searches. The popularity of the source of the point of interest image may be useful for determining the freshness of the point of interest image correctness. Similarly, the user themselves may define a defined priority list of sources for point of interest images which can be used in future queries. For example, the user may indicate in the system that the user wishes to receive point of interest images from social networks before other sources.

The user or system may also use confidence scores for point of interest images. The confidence scores may be used to determine whether to display a point of interest image to a user. Confidence scores for point of interest images may be composed of one or more characteristics related to a point of interest image. The one or more characteristics may include, but is not limited to, the orientation of the mobile device, the time of day, the popularity of the source of the point of interest image, a defined priority list of sources for point of interest images, previous confidences scores for point of interest images, or some combination thereof. For example, the system may use an algorithm which assigns different weights to the one or more characteristics to calculate a confidence score for a point of interest image. If a point of interest image is geotagged the system may give greater weight to the distance from the geotagged image to the user than the particular social network from which the image is drawn from. The weight given to each of the multiple characteristics in calculating the confidence score for the point of interest may be determined by the system, or the user may determine what weight to be given to each of the multiple characteristics. In determining which of two points of interest images to the user the system may determine to use the point of interest image with the higher confidence score.

The system may also select point of interest images to present to a user based off what the user has done in the past. The system may analyze the users past actions, such as the types of places the user visits, specific locations the user visits, types of places the users friends on social networks have been, specific locations the users friends on social networks have been, where the user's friends are located based on a social network, personal information about the user, online purchases the user has made, the applications installed on a user's mobile device, or some combination thereof.

The system may analyze the types of places that a user visits to help determine which point of interest image to display to a user. For example, a user that has visited restaurants would be more likely to see a point of interest image associated with a restaurant. Similarly, a user that visits retail stores, or gyms, would be more likely to be shown a point of interest image associated with a retail store or gym.

Similarly, the system may analyze the specific places that a user visits to help determine which point of interest image to display to a user. Particular businesses, or franchises, visited by the user are analyzed. For example, a user that has visited one particular business, or one or more locations of a franchise business, would be more likely to see a point of interest image associated with that business, or franchise business.

Additionally, the system may take into consideration the types of places that friends of the user on a social network visit, or where their friends on the social network are located. In particular, the system may analyze the types of locations visited by the user's friends to determine which point of interest image to display to the user. The system may look at the locations that the user's friends "check-in" to on social networking sites. Similarly, the system may analyze the images uploaded by the user's friends on social networks to determine any locations associated with the uploaded images. When analyzing the user's friends on social networks the system may also take into consideration specific locations that the user's friends have visited. The system may also take into consideration where the user's friends on social networks are located to determine which point of interest image to display to the user.

The system may also take into account personal information associated with the user. The system may analyze a user's email or calendar applications to determine if a location is stored in the email or calendar application which may be relevant to the routing request. For example, if a user enters a routing request for a particular restaurant, the system may search the user's email application to see if a location, or image, associated with the restaurant is stored, and then use that data to help determine which point of interest image to display to the user.

The system may also note the user's online purchases to help determine which point of interest images to display to the user. For example, if the user has bought one or more pairs of running shoes in the past the system may use that data to determine that a point of interest image geotagged to a known running store should be displayed to the user. Similarly, if the user has made one or more online purchases in a particular category the system may use this data to determine which point of interest image to display to the user. As an example, the user may have made one or more purchases related to "cars" and the system may take this data to determine to display to a user a point of interest image for an auto parts store. As another example, if a user recently purchased a coupon to a particular restaurant the system may take that data into consideration and display a point of interest image associated with that particular restaurant.

The system may also take into consideration the applications the user has installed on the user's mobile device when determining which point of interest image to display. For example, if the user has one or more fitness related applications installed on their mobile device the system may determine to show a point of interest image for a business in the fitness category.

The system may also take into consideration the time of day, month, or season of year, to determine which point of interest image to display to a user. For example, if a user is searching for a restaurant on December 2nd the system may not display point of interest images that are associated with a restaurant that is located on a resort only open during the summer months of June, July, and August. Similarly, when determining point of interest images associated with businesses the system may take into consideration the hours of operation for a business. For example, if a user is searching for a restaurant at 11:00 pm the system would not display to the user point of interest images for restaurants that close at 9:00 pm.

FIG. 4 illustrates an example map view 400 with point of interest images 404-410 overlaid on the map view. The user 402 has reached a location which the server indicates corresponds to the requested point of interest. However, the user indicates that the location does not correspond to the searched for point of interest. Accordingly, the system displays the point of interest images 404-410 as potential new routing locations that may correspond to the searched for point of interest. The point of interest images may be within a predetermined geographic distance, and may also be filtered as described above.

Figure 5:
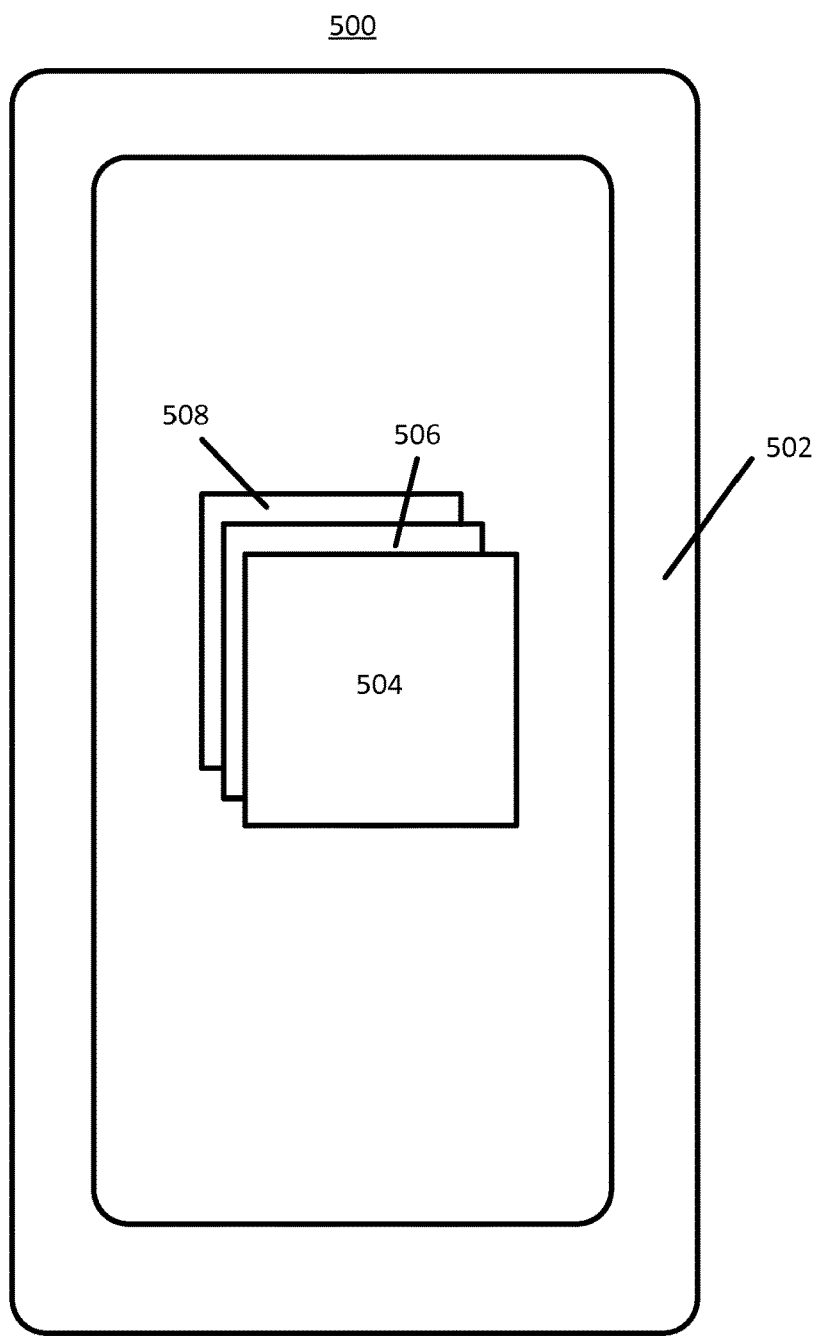
FIG. 5 illustrates an example display of point of interest images stacked on top of each other.
Figure 6:
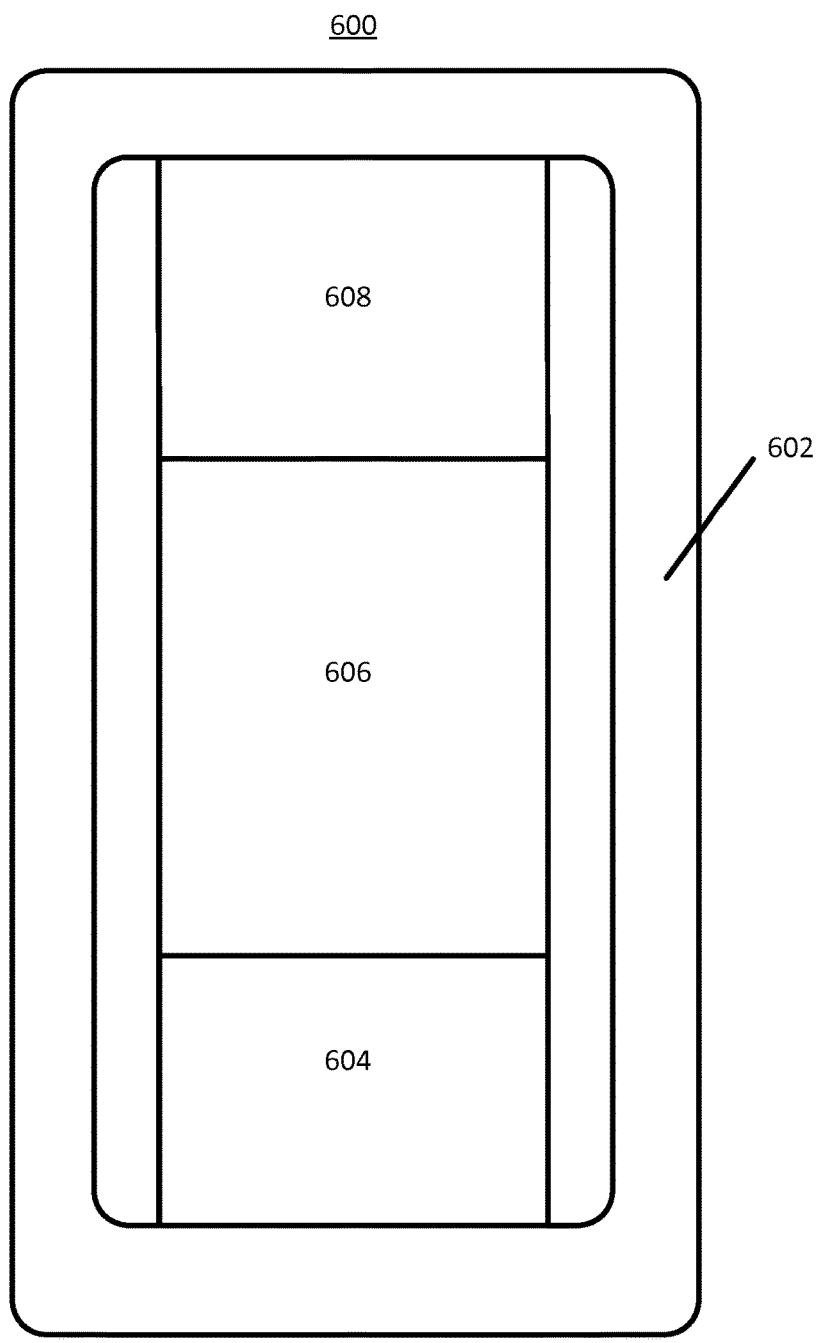
FIG. 6 illustrates an example display of point of interest images displayed to allow for vertical scrolling.
Figure 7:
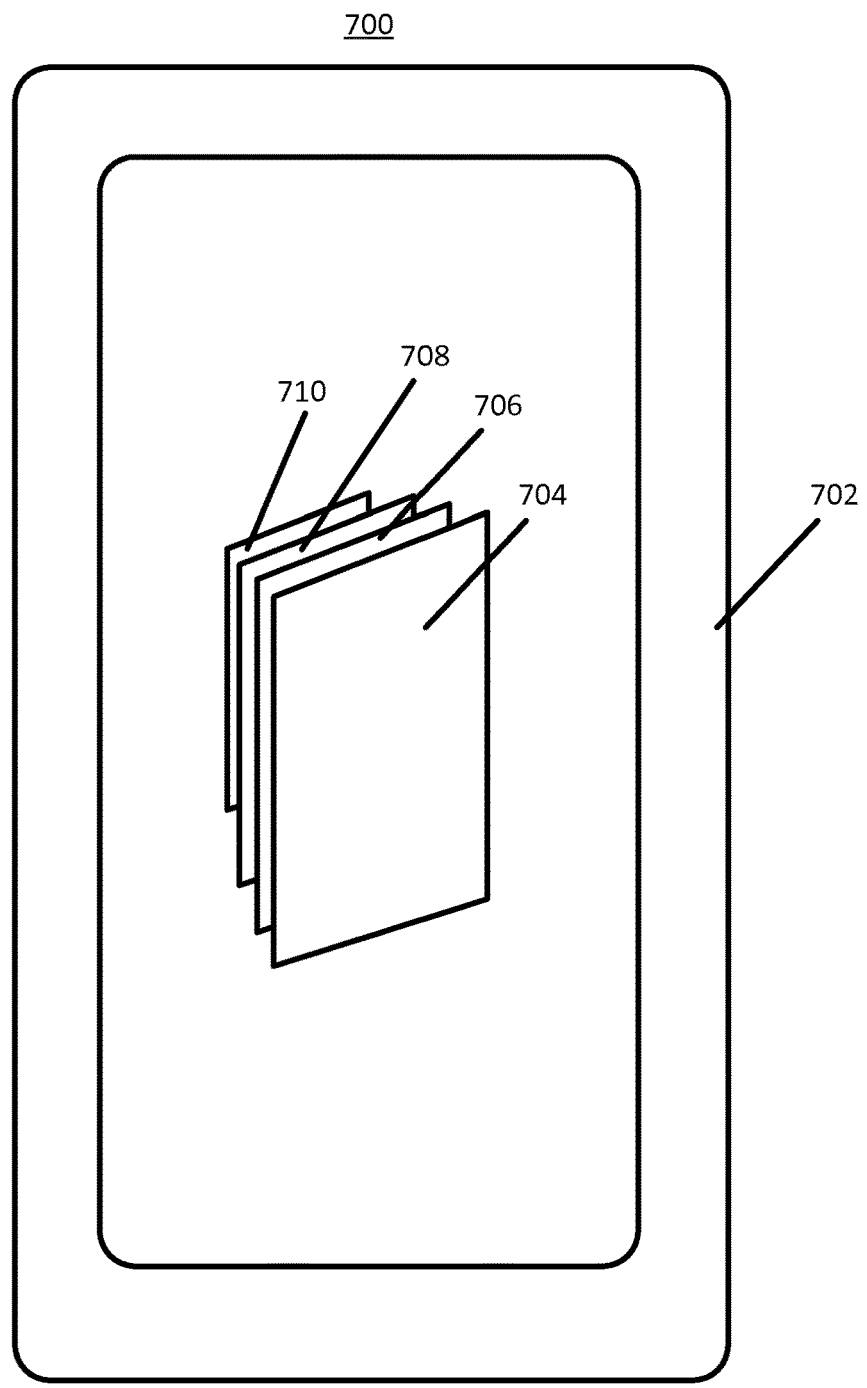
FIG. 7 illustrates an example display of point of interest images displayed to allow for depth scrolling.

FIGS. 5, 6, and 7 illustrate example displays of point of interest images on a user device. The example displays may be displayed on a mobile device, navigation device, or other electronic device used by a user to find a location on a map.

FIG. 5 illustrates an example display 500 of point of interest images 504-508, on a mobile device 502, where the point of interest images retrieved by the system are stacked on top of each other. An initial image 504 may be displayed on the top of the stack. The initial image 504 may be selected as the closest image, most popular image, or otherwise the preferred image for the user. The system may determine the order with which the images are stacked based in part on the confidence score, or another characteristic, of the one or more images. The point of interest images may be formed of pixels. The pixels may have characteristics that define the size, shape, color, brightness or other features. The images may be organized in a data file such as a bitmap file or a raster file, having a size determined by the number of pixels and a depth of the pixels. The depth may be the number of bits per pixels, defining the number of available colors or other characteristics. The format for the image file may be defined according to the standards known as joint photographic experts group (JPEG), exchangeable image file format (Exif), tagged image file format (TIFF), graphics interchange format (GIF) or another suitable image file format.

FIG. 6 illustrates an example display 600 of point of interest images 604-608, on a mobile device 602, where the user may scroll vertically, horizontally, or diagonally, the point of interest images to select the point of interest image they believe corresponds to the searched for point of interest. The system may determine the order with which the user may scroll through the point of images based in part on the confidence score, or another characteristic, of the one or more images.

Similarly, FIG. 7 illustrates an example display 700 of point of interest images 704-710, on a mobile device 702, where the user may scroll through point of interest images in a three-dimensional manner with point of interest images being displayed in increasing size as they appear in the foreground of the display as opposed to the background of the display. The system may determine the order with which the user may scroll through the point of images based in part on the confidence score, or another characteristic, of the one or more images.

Figure 8:
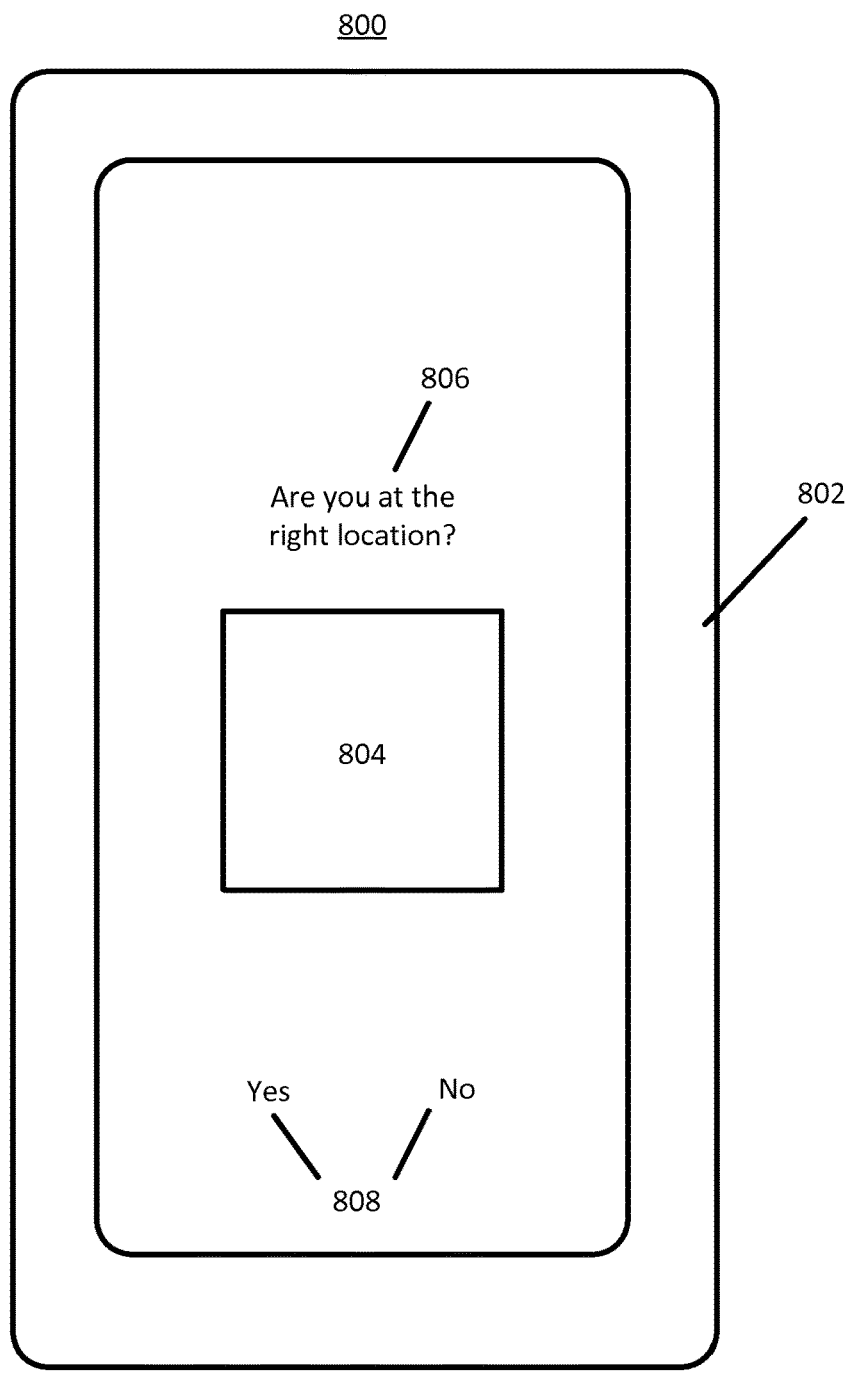
FIG. 8 illustrates an example mobile device prompting a user.

FIG. 8 illustrates an example prompt screen 800 to display to a user of the system. The prompt screen 800 is optional, and the user may initiate the process by requesting the prompt screen 800 or otherwise entering data indicative of an incorrect or unexpected destination. The prompt screen 800 may be displayed on a mobile device 802, and may include, but is not limited to, a point of interest image 804, a message 806, and a confirmation mechanism 808. The confirmation mechanism may include, but is not limited to, a "yes" or "no" response. Alternatively, a user of the mobile device 802 may also confirm the point of interest image 804 as the right image corresponding to their desired point of interest by swiping the point of interest image 804 to the right, left, up, or down, to indicate yes or no as the image's correctness. The user response to the prompt may be recorded by the system and used to update in a table in the database, such as the database 108 of FIG. 1. The user response may also be used to delete entries in a table in the database, create new entries in a table in the database, change characteristics for entries in a table in the database (e.g., weight associated with an images correctness), or increment, or decrement, a counter indicative of the freshness of an image associated with a point of interest image in the database.

Figure 9:
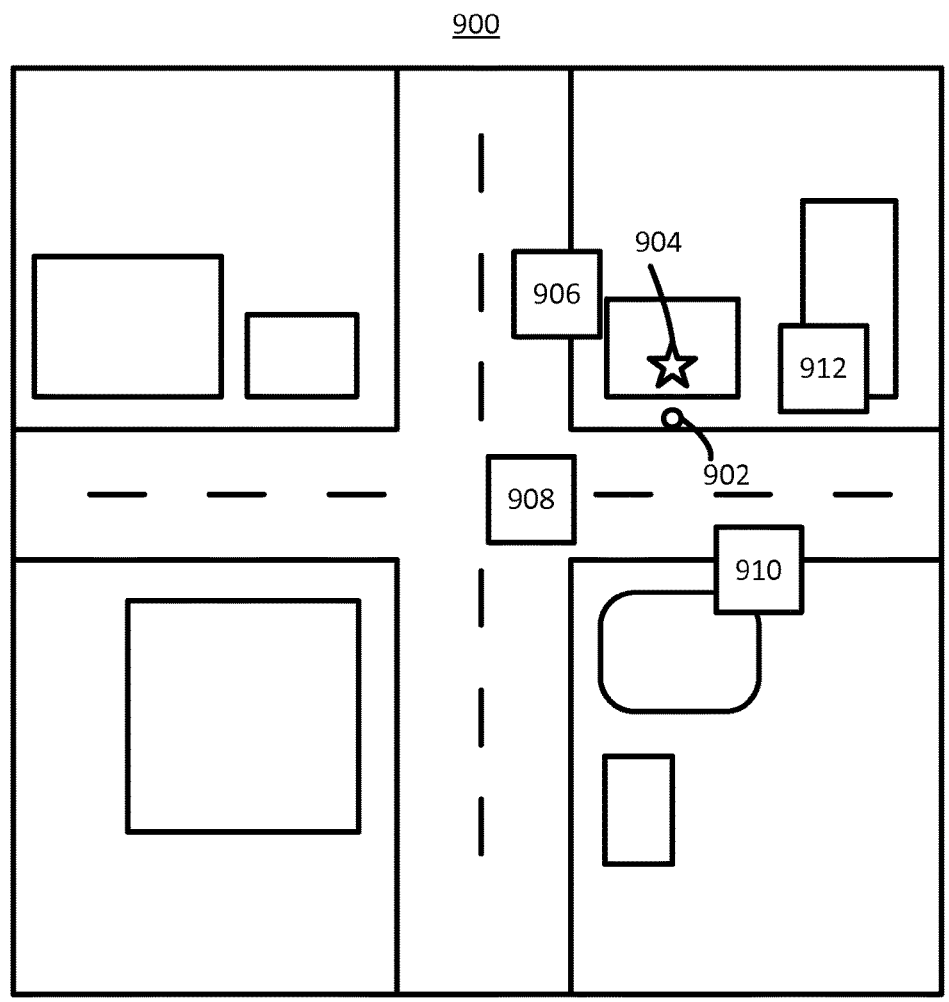
FIG. 9 illustrates an example overhead map of a street intersection with point of interest images overlaid.

FIG. 9 illustrates an example of point of interest images overlaid on a map view 900. In FIG. 9, the user 902 arrives at a point of interest 904 only to discover that the searched for point of interest is not at their present location. The system may display point of interest images 906-912 as options for a user to select as a new routing location. The point of interest images 906-912 may be presented to the user based in part on one or more characteristics which may include, but is not limited to, the orientation of the mobile device, the time of day, the popularity of the source of the point of interest image, a defined priority list of sources for point of interest images, previous confidences scores for point of interest images, or some combination thereof.

For example, the server 110 may access a first confidence score for image 906, a second confidence score for image 908, a third confidence score for image 910, and a fourth confidence score for image 912. The server 110 may compare the confidence scores and arrange the images in an order from the greatest confidence score to the least confidence score, or in the opposite order.

Figure 10:
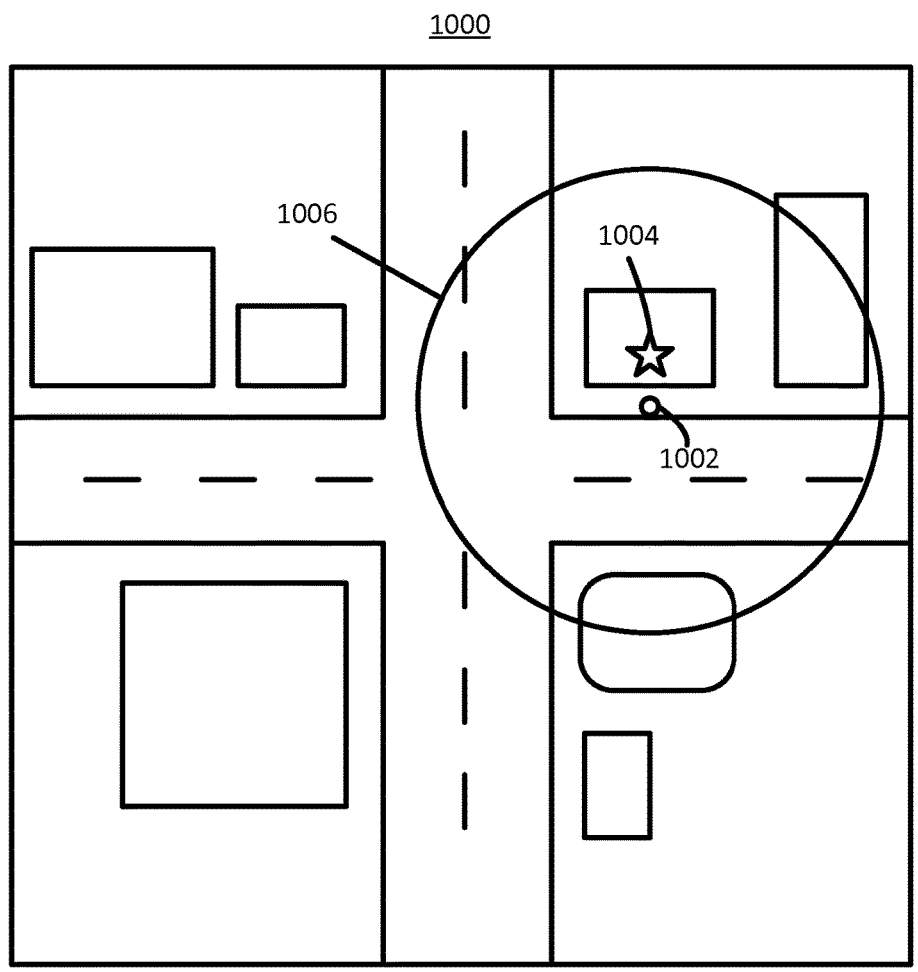
FIG. 10 illustrates an example radius from which to draw point of interest images.

FIG. 10 illustrates an example radius 1006 overlaid on a map view 1000. In FIG. 10, the user 1002 has arrived at a point of interest 1004 and discovered the point of interest is not at their location. The radius 1006 may limit where the system draws potential point of interest images to display to the user. The radius may be determined by the system according to the number of pictures that may be displayed. The radius may be determined by how the user has traveled to the point of interest. The radius may be determined by a distance away from the user location that the system will draw images from to determine potential point of interest images. The radius may also be dynamic and depend in part on how successful particular radiuses have been when used by the user in the past, or by other users. If a particular radius size does not produce any point of interest images that may be used to reroute a user the system may expand or contract the radius accordingly. Additionally, the user may select the parameters which determine the radius.

In another embodiment, in addition to presenting to the user points of interest within a radius, the user may be presented with points of interest within a navigable distance from the user's location. A navigable distance may be the distance it would take for a user to reach a location via roadways, bike paths, or other navigable routes to a location. For example, a user may be only two miles away from a location if they were able to travel a straight line, but because the user is driving a car the user must drive a total of two miles along the navigable distance.

Figure 11:
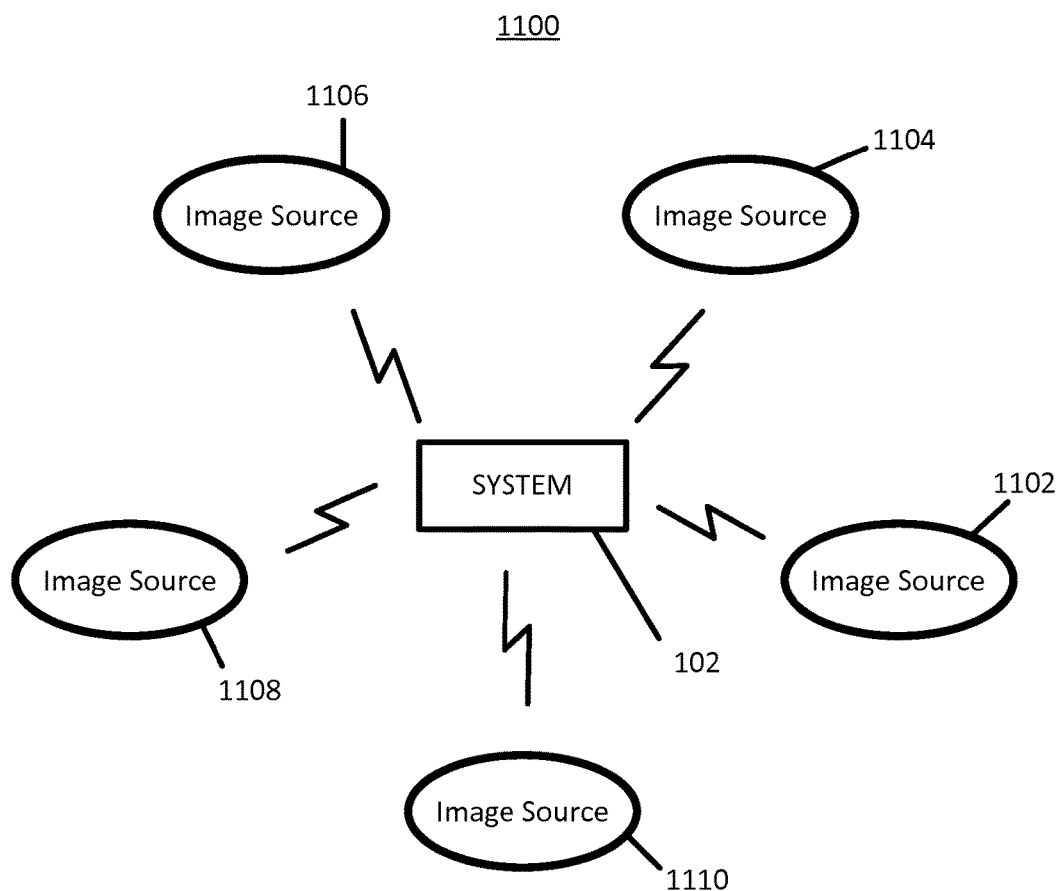
FIG. 11 illustrates an example set of image sources for point of interest images.

FIG. 11 illustrates an example of sources of images 1100 that the system 100 of FIG. 1 may utilize to provide images to a user. The image sources 1102-1110 may include, but is not limited to, a public network, a private network, a social networking service, photograph sharing services, or other sources.

The public network may be the Internet. The public network may include images that are geotagged with the locations from which the images were collected. Cameras may incorporate metadata into images as they are collected. Those images may be uploaded onto the Internet at one or more public locations. The server 110 may crawl the public networks to build a database of geotagged images. Alternatively, the images may be associated with addresses or other location names based on the context of the website, the title of the image, the title of the website, or other metadata.

The private network may be a local area network or another type of private network. For example, the server 110 may be a network device on the private network that has access to image database of one or more users of the databases. The images may be geotagged with location data indicative of locations where the images are taken.

A social network site may allow users to tag images with geographical locations. Alternatively, images on social networking sites may be geotagged as discussed above. The server 110 may crawl social networking services associated with the user of the mobile device (or publicly accessible social networking services) to identify images associated with locations. The server 110 may crawl social networking pages associated with the friends of the user of the mobile device 104.

A photograph sharing sites may allow uses to upload photos and give access to the public or specific users. The server 110 may crawl the photograph sharing sites to identify images that are associated with locations that may correspond to points of interest. The system searches the image sources and assembles a set of images to present to a user.

The set of images may include one or more point of interest images. As described above, the set of point of interest images may be filtered based on one or more characteristics. The filtering may include, but is not limited to, identifying when multiple images are associated with the same point of interest. The filtering may also include, but is not limited to, selecting a representative image from multiple images associated with the same point of interest.

The one or more characteristics may include, but is not limited to, the time of day, the popularity of the source of the point of interest image, a defined priority list of sources for point of interest images, confidences scores for point of interest images, or some combination thereof. The message may display a point of interest image, and a message querying a user if the displayed point of interest image is the correct image that corresponds with the routing request. In some embodiments, the point of interest image displayed to the user is displayed prior to the user arriving at the destination for the routing request. In other embodiments, the point of interest image is displayed to the user when the user arrives at the destination for the routing request. The server 110, or in some embodiments the mobile device 104, is configured to send, to the user device, a set of point of interest images from one or more sources.

Figure 12:
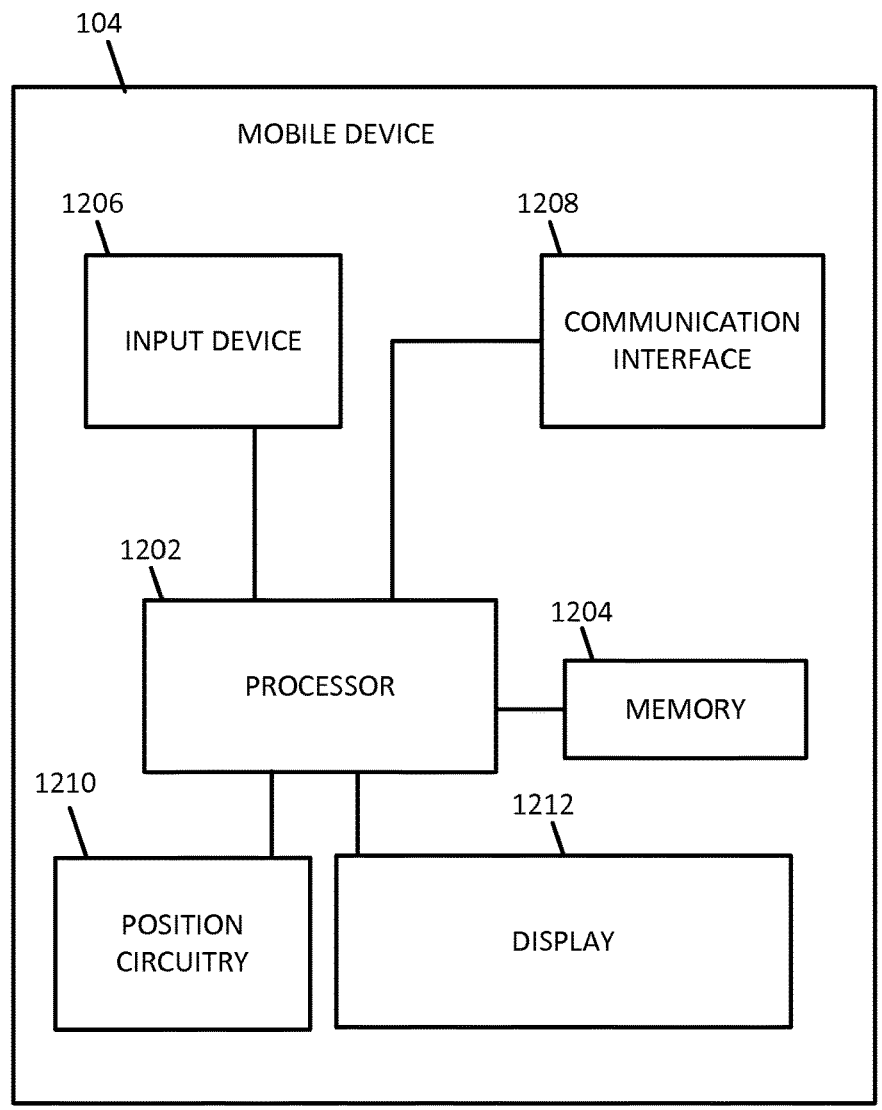
FIG. 12 illustrates an example mobile device.
Figure 13:
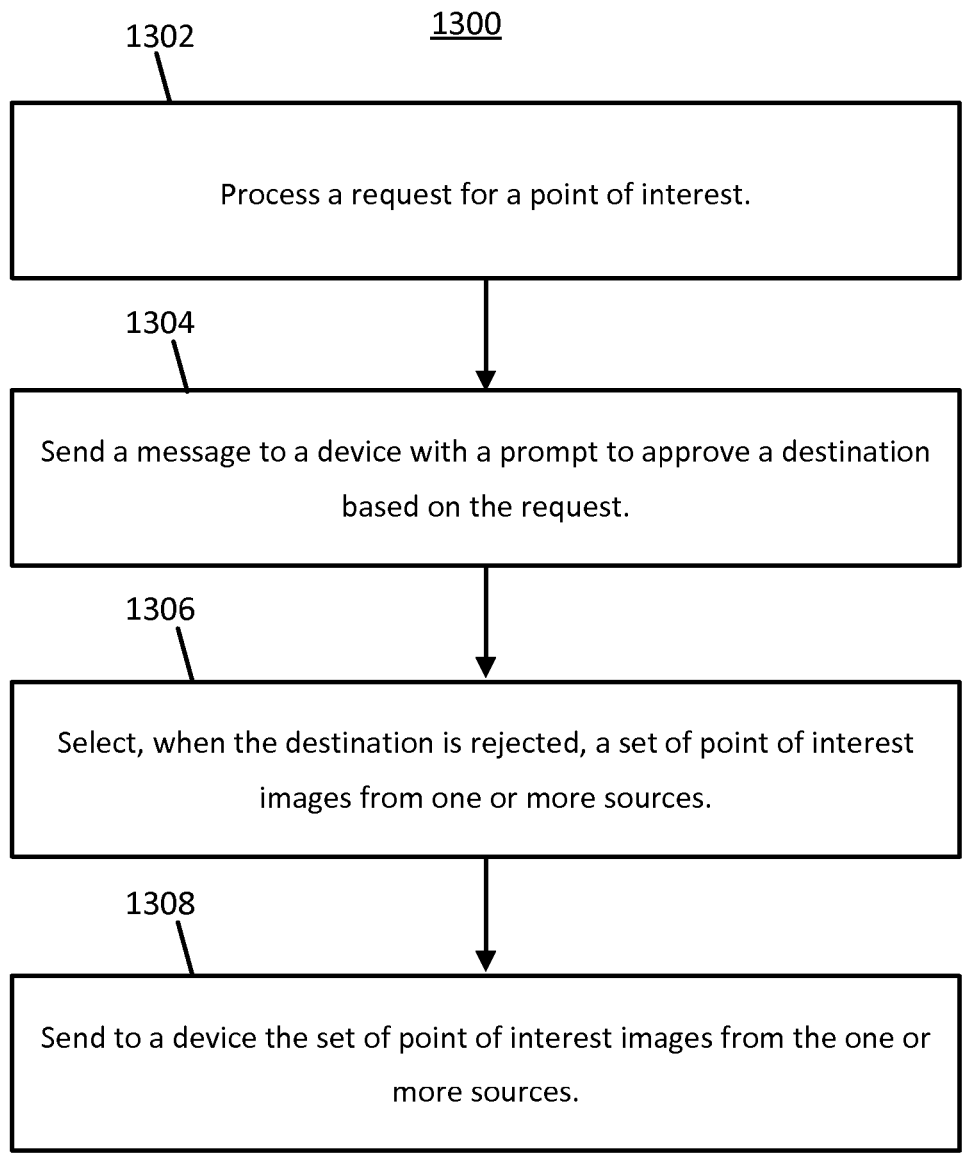
FIG. 13 illustrates an example flowchart for determining image based routing and confirmation.

FIG. 12 illustrates an exemplary mobile device 104 of the system of FIG. 1. The mobile device 104 includes a processor 1202, a memory 1204, an input device 1203, a communication interface 1208, position circuitry 1210, and a display 1212. Additional, different, or fewer components are possible for the mobile device/personal computer 104. FIG. 13 illustrates an example flowchart for determining image based routing and confirmation. The acts may be applied in a different order. Acts may be omitted or repeated. Additional acts may be added. The memory 1204 may store the model previously generated under training examples of sign placements and characteristics under which the sign placements were determined. The mobile device 104 may be a personal device such as a mobile phone equipped with position circuitry (e.g., global positioning system (GPS)) and an inertial measurement unit (IMU). The mobile device 122 may be a specialized device (e.g., not a mobile phone) mounted or otherwise associated with the vehicle 124 and similarly equipped with position circuitry and an IMU. Additional, different, or fewer components may be included.

The position circuitry 1210 generates data indicative of the location of the mobile device 104 ("position data"). In addition or in the alternative to GPS, the position circuitry may include a dead reckoning-type system, cellular location, or combinations of these or other systems. The positioning circuitry may include suitable sensing devices that measure the traveling distance, speed, direction, and so on, of the mobile device 104. The positioning system may also include a receiver and correlation chip to obtain a GPS signal.

At act 1302, the processor 1202 or the communication interface 1208 may be configured to receive data (e.g., point of interest data) including a request for a point of interest. The data may be collected by the position circuitry 1210, a GPS, or other collection device integrated with the mobile device 104. The subsequent point of interest may be any one or combination of a destination, GPS coordinates, previously stored location, user-supplied location, or other type of point of interest data.

At act 1304, the processor 1202 sends a message to the display 1212 with a prompt to approve a destination based on the request that corresponds to the point of interest. The prompt may be the example prompt illustrated in FIG. 8, or another type of prompt. The prompt may include one or more point of interest images that correspond to the request for a point of interest.

At act 1306, when the point of interest is rejected, a set of point of interest images is obtained from the geographic database stored in memory 1204. The set of point of interest images may also be obtained from the set of point of interest images may include one or more point of interest images which fall within a predetermined radius of the mobile device 104 location as determined by the position circuitry 1210, a GPS, or other collection device integrated with the mobile device 104.

At act 1308, the processor 1202 sends to the display 1212 the set of point of interest images from the one or more sources. The set of point of interest images may be user-supplied point of interest images, crowd-sourced point of interest images, point of interest images accessed from a third party application or website, or point of interest images from other sources. The mobile device may record the user response to the prompt that displays the point of interest. The confirmation or rejection of the point of interest may be used to update, delete, or add to the database entry associated with the point of interest.

Figure 14:
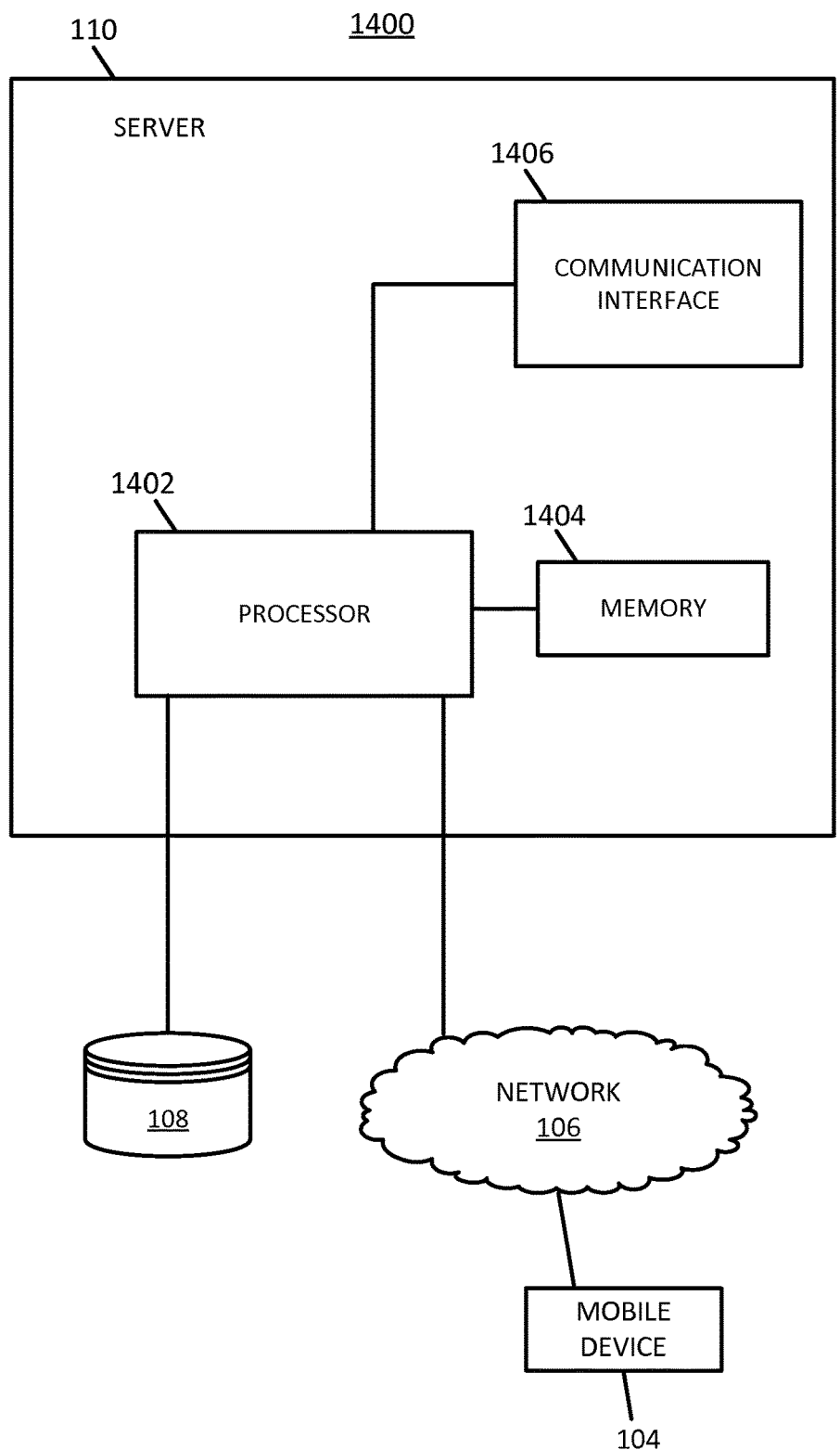
FIG. 14 illustrates an example server arrangement for determining image based routing and confirmation.
Figure 15:
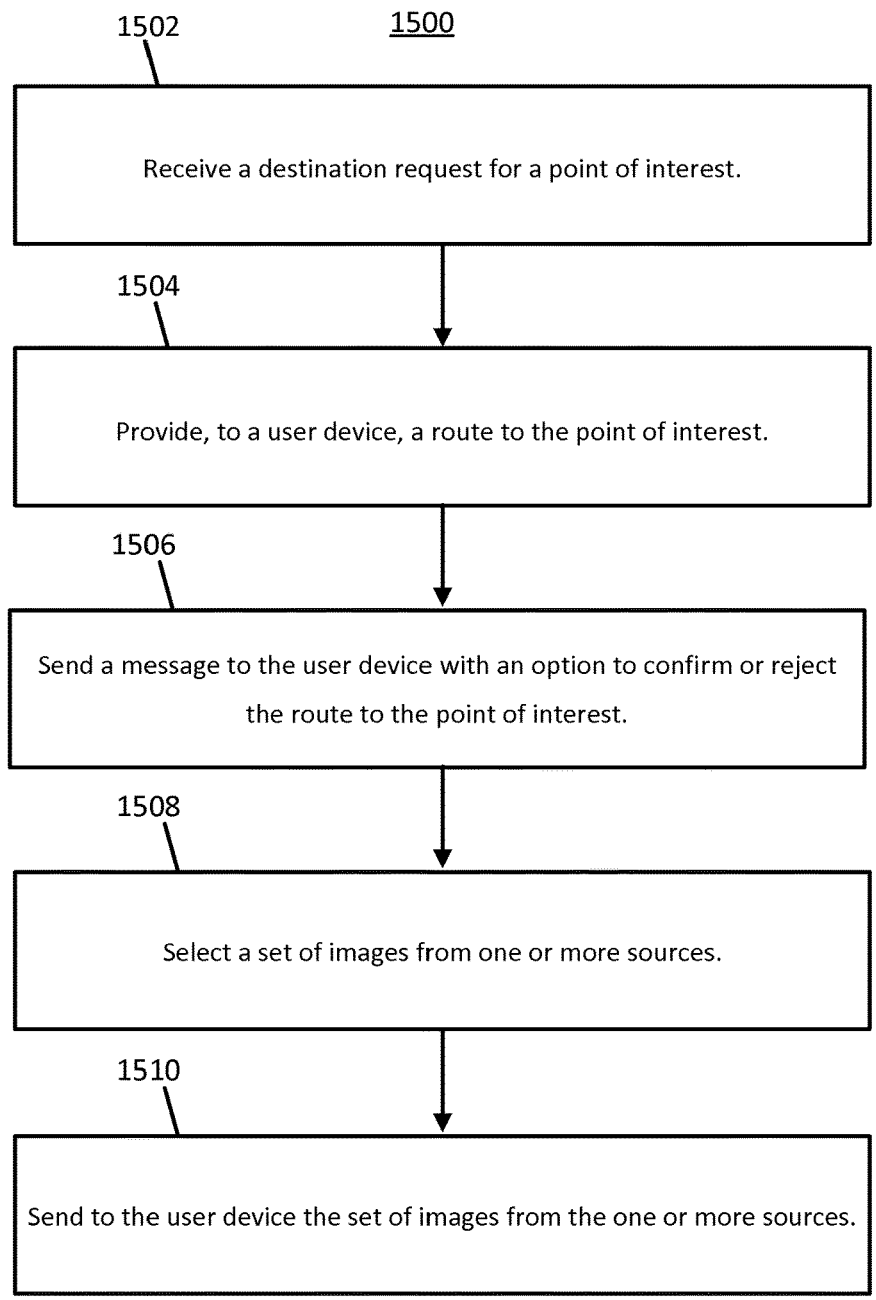
FIG. 15 illustrates an example flowchart for determining image based routing and confirmation.

FIG. 14 illustrates an example network device (e.g., server 110) of the system of FIG. 1. The server 110 includes a processor 1402, a communication interface 1406, and a memory 1404. The server 110 may be coupled to a database 108 and a mobile device 104. The mobile device 104 may be used as an input device for the server 110. In addition, the communication interface 1406 is an input device for the server 110. In certain embodiments, the communication interface 1406 may receive data indicative of user inputs made via the mobile device 104. FIG. 16 illustrates an example flowchart for determining image based routing and confirmation. The acts of the flowchart of FIG. 15 may alternatively be performed by the server 110, or a group of servers. Different, fewer, or additional acts may be included.

At act 1502, the processor 1402 or communication interface 1406 receives a destination request for a point of interest through a network 106. At act 1504, the processor 1402 or communication interface 1406 provides, to a user device 104, a route to the point of interest. The route to the point of interest may be determined by the processor 1402, determined by a route preference stored in the memory 1404 corresponding to the particular user device 104, or may be a route selected by a user.

At act 1506, the processor 1402 or communication interface 1406 sends a message to the user device 104 with an option to confirm or reject the route to the point of interest. The message sent to the user may take the form of the example prompt illustrated in FIG. 8, or another type of prompt. Act 1506 may be omitted. For example, the user may initiate the rejection of the destination to the point of interest unilaterally. The processor 1402 or communication interface 1406 may receive data indicative of the rejection without first sending any options to the mobile device.

At act 1508, the processor 1402 selects a set of images from one or more sources. The set of images may also be obtained from a public network, such as the Internet, a private network, such as an intranet, social networking sites, photo sharing sites, a map developer database, or combinations thereof. At act 1512, the processor 1402 or communication interface 1406 sends to the user device 104 the set of images from the one or more sources. The system may update the database with the user selection, making necessary changes to entries in a table in a database. When an image from the set of images is selected the system may reroute a user to the new location associated with the point of interest image selected by the user. The process iterates until the user ends up at their intended destination with the system making the necessary updates, additions, and deletions from the system database through each iteration of the process.

In addition to the data describe above, the database 108 may include node data records, road segment or link data records, POI data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques).

The road segment data records are links or segments representing roads, streets, or paths, as can be used in the calculated route or recorded route information for determination of one or more personalized routes, according to exemplary embodiments. The node data records are end points corresponding to the respective links or segments of the road segment data records. The road link data records and the node data records represent a road network, such as used by vehicles, cars, and/or other entities. Alternatively, for example, the database 108 may contain path segment and node data records or other data that represent pedestrian paths or areas in addition to or instead of the vehicle road record data.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The database 108 may include data about the POIs and their respective locations in the POI data records. The database 108 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the database 108 can include event data (e.g., traffic incidents, constructions, scheduled events, unscheduled events, etc.) associated with the POI data records or other records of the database 108.

Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may also include data that indicate a classification, such as a rank of a road segment that may correspond to its functional class. Example functional classes include arterial roads, collector roads, and local roads. The prerecorded path may include roads outside of the functional classification system. Alternatively, an additional functional classification (e.g., private roads, temporary roads, or personalized roads) may be added to the geographic database to distinguish the prerecorded paths from other segments. Incident rates may be assigned to road segments based on functional classification.

The database 108 may be maintained by a content provider (e.g., a map developer). By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The computing device processor 1202 and/or the server processor 1402 may include a general processor, digital signal processor, an application specific integrated circuit (ASIC), field programmable gate array (FPGA), analog circuit, digital circuit, combinations thereof, or other now known or later developed processor. The mobile device processor 1202 and/or the server processor 1402 may be a single device or combinations of devices, such as associated with a network, distributed processing, or cloud computing. The computing device processor 1202 and/or the server processor 1402 may also be configured to cause an apparatus to at least perform at least one of methods described above.

The memory 1204 and/or memory 1404 may be a volatile memory or a non-volatile memory. The memory 1204 and/or memory 1404 may include one or more of a read only memory (ROM), random access memory (RAM), a flash memory, an electronic erasable program read only memory (EEPROM), or other type of memory. The memory 1204 and/or memory 1404 may be removable from the mobile device 104, such as a secure digital (SD) memory card.

The communication interface 1208 and/or communication interface 1406 may include any operable connection. An operable connection may be one in which signals, physical communications, and/or logical communications may be sent and/or received. An operable connection may include a physical interface, an electrical interface, and/or a data interface. The communication interface 1208 and/or communication interface 1406 provides for wireless and/or wired communications in any now known or later developed format.

In the above described embodiments, the network 106 may include wired networks, wireless networks, or combinations thereof. The wireless network may be a cellular telephone network, an 802.11, 802.16, 802.20, or WiMax network. Further, the network 106 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving a routing request for a point of interest;
   sending a message to a user device with an option to confirm or reject a destination based on the routing request;
   selecting, when the destination is rejected, a set of point of interest images from one or more sources, the set of point of interest images collected at geographic locations of respective points of interest;
   filtering the set of point of interest images based on one or more characteristics;
   identifying, in response to the filtering, when multiple images are associated with a same point of interest;
   selecting a representative image from the multiple images associated with the same point of interest;
   sending, to the user device, at least the representative image from the set of point of interest images from the one or more sources;
   receiving a selection of a selected image; and
   calculating a route to another destination according to the selected image.

2. The method of claim 1, wherein the set of point of interest images comprise one or more indoor images.

3. The method of claim 1, wherein a point of interest image is associated with a user selected location within a geographic database, and the set of point of interest images are associated with other locations within the geographic database.

4. The method of claim 3, wherein the set of point of interest images are within a predetermined geographic distance of the user selection location.

5. The method of claim 1, wherein the one or more characteristics comprise an orientation of the user device and location metadata associated with each image from the set of point of interest images.

6. The method of claim 1, wherein the one or more characteristics comprise a time of day.

7. The method of claim 1, wherein the one or more characteristics comprise a popularity rating, priority rating, or confidence score, or some combination thereof, for each point of interest image in the set of point of interest images.

8. The method of claim 1, wherein the one or more sources comprise a photograph sharing website.

9. The method of claim 1, wherein the one or more sources comprise a local network.

10. The method of claim 1, wherein the one or more sources comprise a public internet site.

11. An apparatus comprising:
    at least one processor; and
    at least one memory including computer program code for one or more programs; the at least one memory and the computer program code configured to, with the at least one processor, cause the apparatus to at least perform:
    process a request for a point of interest from a device;
    send a message to a device with a prompt to approve or reject a destination that corresponds to the point of interest;
    select, when the destination is rejected, a set of point of interest images;
    filter the set of point of interest images based on one or more characteristics;
    identify when multiple images of the filtered set of point of interest images are associated with a same point of interest;
    select a representative image from the multiple images associated with the same point of interest;
    send, to the device, at least the representative image of the set of point of interest images;

receive a selection of a selected image from the set of point of interest images; and calculate a route according to the selected image.

12. The apparatus of claim 11, wherein the one or more characteristics comprises an orientation of the device and location meta data associated with each image from the set of point of interest images.

13. The apparatus of claim 11, wherein a point of interest image is associated with a user selected location within a geographic database, and the set of point of interest images are associated with locations within the geographic database.

14. The apparatus of claim 11, wherein the set of point of interest images comprise one or more indoor images.

15. A non-transitory computer readable medium including instructions that when executed are operable to:

receive a destination request to a point of interest;

present a route or a portion thereof to the point of interest;

filter a set of images based on one or more characteristics;

provide an option via a user device to display a representative image when multiples images of the filtered set of images are associated with a same point of interest, based on a location corresponding to the requested point of interest or based on a current location of the user device when the current location is within a predefined distance from the location corresponding to the requested point of interest, wherein images within the set of images are selectable; and calculate a route or portion thereof to a location corresponding to a selected image within the set of images.

16. The non-transitory computer readable medium of claim 15, wherein the set of images are selected in response to an indication from the user device which indicates that the route is rejected.

* * * * *